May 19, 1942.  K. H. HACHMUTH  2,283,499
CATALYTIC PROCESS
Filed Nov. 7, 1939
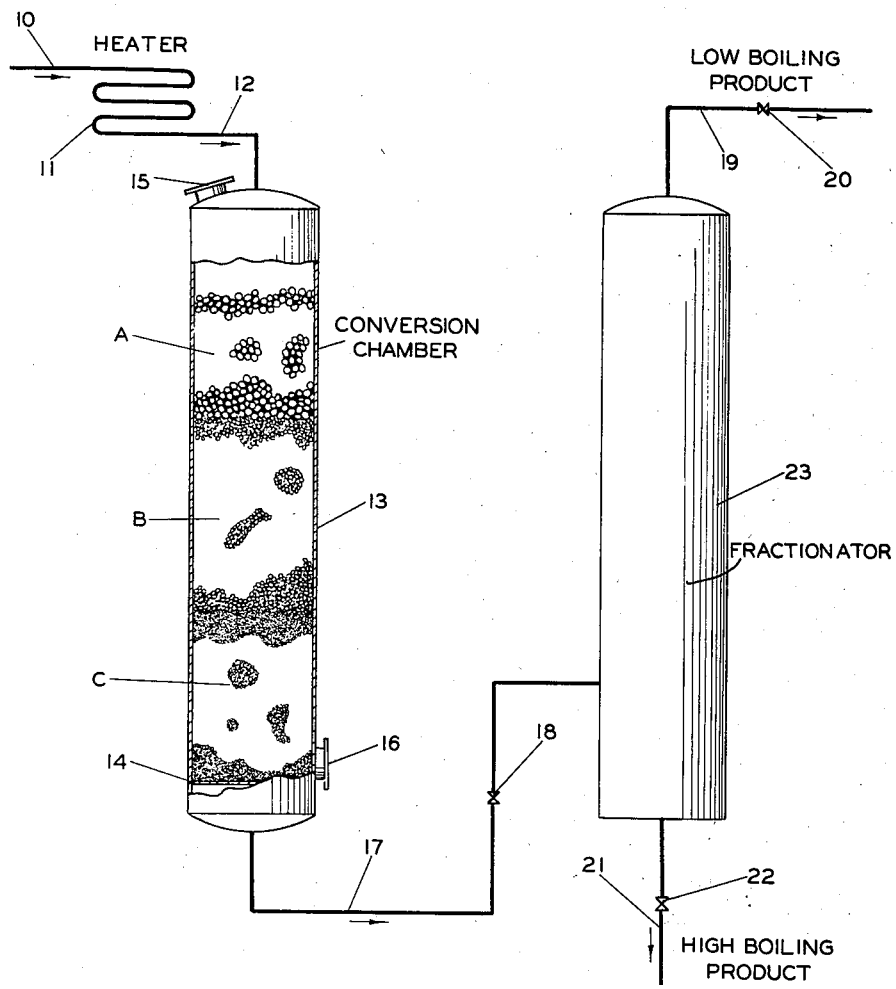
INVENTOR
KARL H. HACHMUTH
BY
ATTORNEY Patented May 19, 1942

2,283,499

UNITED STATES PATENT OFFICE 2,283,499

CATALYTIC PROCESS

Karl H. Hachmuth, Bartlesville, Okla., assignor to Phillips Petroleum Company, a corporation of Delaware Application November 7, 1939, Serial No. 303,317

7 Claims. (Cl. 196—10)

This invention relates to processes in which solid catalysts are used to promote the reactions involved, and more particularly it relates to a novel method of using solid, granular catalysts in catalyst towers or chambers.

Solid catalysts are used in many industries to promote numerous reactions and thereby to make possible a multitude of processes. Such processes involve oxidation, reduction, hydration, dehydration, hydrolysis, dehydrogenation, polymerization, depolymerization, splitting, hydrogenation, halogenation, hydrohalogenation, cyclization, and condensation reactions, and the like in gaseous, liquid and/or mixed phases, under wide ranges of temperature, pressure and reaction time. In many processes, very finely divided, more or less powdery solid catalysts are used, forming a slurry, suspension or colloidal mixture with the reacting mixture, which may be undergoing treatment in either a batch or a continuous process. In other processes a relatively coarse, granular catalytic material is used, which may at times also be intimately mixed with a reacting mixture in a batch process, or flow with the reacting mixture in a continuous process. However, in most processes wherein such a coarse, granular catalytic material is used, it is disposed as a large body or mass in a catalyst chamber and the material to be treated is passed through this mass of catalyst while at a suitable reaction temperature and under a suitable reaction pressure, the rate of flow generally being such that a desired contact time of the reacting material with the catalyst, or period of residence in the presence of the catalyst mass, is obtained. Such a treatment is used especially in hydrogenation processes, such as in the nondestructive hydrogenation of hydrocarbons, edible oils and the like and the destructive hydrogenation of heavy petroleum oils, the removal of gum and color-forming bodies from hydrocarbon fractions, the reforming of motor fuels, the polymerization of light unsaturated hydrocarbons to form motor fuels and heavier hydrocarbons, the catalytic cracking of heavy petroleum oils and the like, the hydration of olefin hydrocarbons to form alcohols, the dehydration and dehydrogenation of alcohols, the reaction of hydrogen and carbon oxides to form various organic compounds, the partial oxidation of hydrocarbons to form a multitude of derivatives, the oxidation of sulfur dioxide, the addition of a hydrogen halide or a halogen to an olefin, and the like.

Various methods have been proposed and used for forming such solid granular catalysts having a relatively coarse particle size. In some of these an inert, granular supporting material having a more or less uniform particle size is coated or impregnated with a suitable catalytic material, or with a compound or mixture which is readily converted to a catalytic material. In other cases the catalyst particles are composed of a uniform catalytic material, and may have a uniform or non-uniform particle size, such as when a natural material such as fuller's earth or bauxite is used as a catalyst, or when the catalyst is a dried gel, such as a silica gel or a chromium oxide gel or an alumina gel or the like. In these cases, and especially in the case of the latter material, there is a serious disadvantage connected with the use of these materials in that, in the formation of the final particles, not only is an appreciable proportion of the original material unsuitable for use because of its extreme fineness or small particle size, but also the material which is not too fine for use is of a non-uniform size. While this non-uniformity of particle size does not appreciably affect the initial catalytic activity, it results in a very compact catalyst mass which produces an appreciable and undesirable pressure drop when a liquid or vapor fluid mixture is passed through it at an appreciable velocity, and this pressure drop rapidly increases in those cases where deleterious deposits collect on the catalyst, such as are produced by undesirable side reactions.

Still other coarse, granular catalysts are used in the form of artificially formed particles, generally having a very uniform particle size, such as can be produced by pelleting or extruding a plastic or semi-plastic material. While there is some advantage to be gained by using a catalytic material composed of such artificially prepared particles over the use of non-uniform catalyst particles, the cost of such forming is often an appreciable proportion of the total catalyst expense, and often the activity of the catalyst is appreciably decreased, an effect which appears to be caused, at least in part, by the physical, or possibly chemical, structure of the compacted outer surface or "skin" formed on the mass as it is pelleted under pressure or forced under pressure through the die of an extrusion apparatus. While such a difficulty may be overcome by crushing or breaking the artificially formed particles, the same disadvantages result from this procedure as have been discussed hereinbefore in connection with other granulated catalysts.

I have now found that a coarse granular or granulated catalytic material composed of particles which are non-uniform in size may be successfully used in a catalytic conversion process with a minimum of pressure drop through the catalyst mass by classifying the catalyst particles into a plurality of portions, each consisting of catalyst particles within a rather narrow size range and each portion with a different average particle size from the other portions, and placing each portion or catalyst separately in a catalyst chamber. I have further found that, when the separate portions are placed so that the reactant fluid, or material to be converted and undergoing conversion, will flow through the combined catalyst mass in a direction such that it contacts the coarser particles first and the finer particles last, the pressure drop throughout the catalyst mass will remain at a low value during an extended period of time, and will show a minimum tendency to increase, as compared with the pressure drop associated with the use of a granular catalytic material having an unclassified, non-uniform particle size, or with a classified material with the portions arranged in any other manner. The application and practice of my invention may be carried out in connection with the use of any solid, granular catalytic material which is produced or available with the particles in a plurality of size classes. I have used it more extensively in connection with processes in which the catalysts were prepared from, or comprised, dried gels, but it may also be applied to natural clay-like materials, impregnated or supported catalysts such as those prepared using pumice, bauxite, charcoal, porous porcelain or the like as supports, or with extruded or pelleted catalytic materials. In connection with the latter, that is, artificially formed catalytic particles, the invention will generally not be practiced since the particles have quite a uniform size, but it may be applied in those cases where catalyst particles of more than one size are prepared, and it may especially be applied in connection with such catalytic materials when they are broken into smaller particles after being artificially formed into larger particles.

It is an object of my invention to use a solid granular mass of catalyst having non-uniform particle sizes in an efficient manner.

It is a further object of my invention to arrange or dispose a solid granular catalytic material in a catalyst chamber in such a manner that the subsequent passage of material to be treated in the presence of the catalyst may be accomplished with a relatively low pressure drop.

Another object of my invention is to use a mass of solid granular catalytic material having a non-uniform particle size in an efficient manner without discarding too large a portion of the catalyst mass because of its irregular particle size.

Further objects and advantages of my invention will be seen after considering the disclosure and discussion of this specification.

My invention can, in general, be applied to any one of a number of methods of using solid, granular catalysts. However, I prefer to practice my invention in connection with the use of rather large masses of catalysts in elongated catalyst chambers, and preferably in vertical catalyst chambers having diameters of from about 3 or 4 inches to several feet. The most preferable manner of practicing my invention is to place, in a vertical catalyst tower or chamber, two or more portions of a granular catalytic material, each portion having substantially only particles in a restricted size range, with the finer, or finest, catalytic material on the bottom end with higher portions being successively coarser, and subsequently introducing the material to be converted into the top of the catalyst chamber, the reacting material passing downwardly through the combined catalyst mass, and withdrawing the resultant mixture from the bottom of the catalyst chamber. The entire catalyst mass may be supported on a grating, perforated plate, screen, or the like, or any combination thereof, methods for the support of a mass of granular catalytic material in such a catalyst chamber being common practice and well known to those skilled in the art. When the reactants are introduced at the bottom of a vertical catalyst chamber, and the effluent is withdrawn from the top of the chamber, the catalyst mass should be arranged with the coarse size at the bottom of the chamber, adjacent the inlet, and with the fine particles near the top of the chamber, adjacent the exit. In such a case, it is generally preferable to place a grating or screen on top of the catalyst bed or mass, as well as having it rest on a support at the bottom, in order that catalyst particles will not be swept out of the chamber. When a horizontal elongated chamber is used, the same relationship of particle size to flow of reactants is to be used, but of course it will be necessary to make some provision for preventing, or compensating for, the settling of the catalyst mass away from the top side of the catalyst chamber. It is intended that, in the most preferable mode of operation, the catalyst chamber will have a relatively large cross section, rather than comprising a bundle of small catalyst tubes, since the latter are quite difficult to charge with catalyst in a uniform manner when a non-uniform granular catalyst is used. However, this is not an insurmountable difficulty and when such a difficulty is not an economic barrier to the practice of my invention, its application is not to be excluded.

My invention can be practiced in apparatus similar to that diagrammatically illustrated by a flow sheet in the accompanying drawing, in which a catalyst chamber is shown in partial section.

A catalyst chamber 13 is used, which is supplied with a suitable catalyst support 14, a manhole 15 at the top for introducing catalyst, and a manhole 16 at the bottom for removing catalyst. A mass of solid granular catalytic material, suitable for promoting the desired conversion and of non-uniform particle size, is classified by sieving into coarse, medium, and fine portions A, B and C respectively, these portions being derived from the entire original catalyst mass. The catalyst chamber is charged first with the fine portion C on the bottom, next with the medium portion B, and finally with the coarse portion A at the top.

A hydrocarbon material to be converted, such as a hydrocarbon mixture containing low boiling olefins to be polymerized to polymers, in the motor fuel boiling range, is introduced to the system under suitable pressure through pipe 10 and is heated to a suitable conversion temperature in heating coil 11. The heated material, at a conversion temperature and pressure, is passed through pipe 12 to the inlet of the catalytic conversion chamber 13, which in this case is at the top. After passing through the catalyst chamber and undergoing conversion in the presence of the catalyst, the conversion effluent is removed from the outlet, in this case from the bottom through pipe 17, and is passed through control valve 18 to separating means illustrated by fractionator 23. A low-boiling product of the conversion is recovered through pipe 19 controlled by valve 20, and a high-boiling product is recovered through pipe 21 controlled by valve 22. One or more intermediate fractions may, of course, also be recovered.

When the conversion is one of olefin polymerization, the low-boiling product will comprise unreacted hydrocarbons and the high-boiling product will comprise polymers. When other conversion operations are conducted, such as the catalytic cracking of high-boiling hydrocarbons to form low-boiling hydrocarbons, the low-boiling product will comprise such low-boiling hydrocarbons and the high-boiling product will comprise unreacted hydrocarbons.

Any known method of classifying the catalyst mass into portions, each of a relatively restricted particle size range, may be used, various screening and elutriation methods being well known to the art. Many methods are known for defining and describing particle size and the range of particle sizes in any classified portion. In this specification and disclosure reference will be made, as a matter of convenience only, to particle size and range in connection with the Tyler standard screen-scale sieves, which constitute one of several well known and accepted standards, and which are made available by the W. S. Tyler Company, Cleveland, Ohio. In making the actual classification, large, commercially available screens will generally be used, and in most cases such screens will closely approximate various ones of these standard sieves.

A mass of catalytic material which has been crushed, or which has been broken up by other means as by the shattering which accompanies the decrepitation phenomenon which occurs when many dried gels are placed in water, will contain particles differing widely as to size, and the larger particles will generally have a diameter at least 10 or more times as large as the diameter of the smallest particles. In the classification of the particles according to size, I prefer that in any one class the largest particles should have a diameter not any greater than about 4 times the diameter of the smallest particles, and in the most preferable modifications, the largest particles should have a diameter less than 2 times the diameter of the smallest particles. It will be understood, of course, that in such a classification of a granular catalytic material, there may be some particles or size classes too large or too small for use and, so far as material to be used directly in the catalyst chamber without further decrease in size or agglomeration, these particles will be discarded. When it is stated in the claims that the catalytic material is divided into a plurality of portions of differing average particle size, it is to be understood that at least two such portions are to be placed in the catalyst chamber, and not necessarily that all the portions into which the catalytic material is divided need be used. While it will generally be true that no portion or class will contain substantial amounts of particles which are also contained in some other class, such as is obtained when, for example, a material is carefully divided into a 4 to 8 mesh class, an 8 to 12 mesh class, and a 12 to 20 mesh class, this will not always or necessarily be true, and a material may also be divided into overlapping classes or portions, as when it is divided into a 4 to 10 mesh class, an 8 to 16 mesh class and a 14 to 24 mesh class, or the like. While such divisions are not full equivalents, other considerations may make one or the other such division desirable at any one time, and neither should be considered outside the scope of the invention.

*Example I*

The following is cited as an example of the advantages to be realized by practicing my process. A cylindrical catalyst chamber having a cross section of 7.8 square centimeters was filled to a depth of 61 centimeters with a granular catalytic material having a non-uniform particle size. The classification of the catalyst, and the initial pressure drop, as determined by passing air at atmospheric pressure through the catalyst bed, is shown in the following table for three different cases. In every case the air was passed from top to bottom through the catalyst bed, and in the cases of the classified material, the portions of catalyst were arranged with increasing particle size from bottom to top. The two classified batches of catalyst were from the same source as was the unclassified batch.

| Catalyst batch | Range of particle size (mesh) | Weight per cent of each portion | Rate of air flow, cc/sec/sq. cm. | Pressure drop, atm.×100 |
|---|---|---|---|---|
| I | 4–35 | Unclassified | 15 | 2.56 |
| II | 4–10 | 15 | 15 | 2.20 |
|  | 10–28 | 75 |  |  |
|  | 28–35 | 10 |  |  |
| III | 4–8 | 11.5 | 15 | 1.95 |
|  | 8–10 | 5.8 |  |  |
|  | 10–14 | 16.4 |  |  |
|  | 14–20 | 37.5 |  |  |
|  | 20–28 | 19.2 |  |  |
|  | 28–35 | 9.6 |  |  |

Not only did the catalyst beds containing classified catalyst particles have lower initial pressure drops, but these beds show practically no tendency to pack when high pressures are used, and the pressure drop does not increase materially with time, except as the accumulation of foreign material on the catalyst may cause an increased pressure drop.

*Example II*

An olefin polymerization catalyst known as a "silica-alumina" catalyst was prepared by first treating, or activating, a partially dried and washed hydrous silica gel with a 5 per cent aqueous aluminum sulfate solution. After this treatment, or activation, the gel was washed with water, dried further and again treated with an aluminum sulfate solution, washed until the effluent wash water was substantially free of sulfate ions, and the activated gel dried. The initial hydrous silica gel was broken up into large chunks by being forced through a coarse screen having holes about one inch on a side, so that a large portion of the particles approximated cubes with one inch edges. This material shrank appreciably during the drying steps, but inasmuch as the latter treating steps were carried out on a comparatively well dried gel, it had become sufficiently finely divided, by the breaking up of the particles which accompanies the well-known decrepitation phenomenon that takes place when dried gels are placed in water, so that the largest particle size of the final catalytic material was about 4 mesh, as determined by the hereinbefore mentioned Tyler standard sieve.

This material was classified into four classes of particle size, namely: (1) 4 to 12 mesh, (2) 12 to 20 mesh, (3) 20 to 35 mesh, and (4) finer than 35 mesh. The finest material was discarded, and the remainder charged to a vertical catalyst chamber, the finest portion, or class (3), on the bottom, the medium portion in the middle, and the coarsest portion, or class (1), on top. The cylindrical chamber filled by the catalyst was 16 inches in diameter and 16 feet 6 inches high. A $C_3$—$C_4$ hydrocarbon fraction containing about 12.5 mol per cent each of propene and of butenes was passed through this catalyst bed at a polymerizing temperature under an inlet pressure of 1500 pounds per square inch. The initial pressure drop through the catalyst bed was only about 20 pounds per square inch and after a period of several days this pressure drop had not increased materially. In contrast, another portion of the same catalyst not so classified produces an initial pressure drop about 20 per cent greater and this pressure drop tends to increase as the polymerization proceeds.

This catalytic material is also highly efficient in catalytic depolymerization and cracking processes wherein hydrocarbons in the motor fuel boiling range are produced from heavier hydrocarbons. However, there are considerable deposits of a carbonaceous nature formed on the catalyst in such processes, whether this or other cracking catalysts are used. Such deposits cause a rapid increase in the pressure drop through a catalyst bed, as well as a decrease in catalytic activity. The application of my invention to such processes prolongs the active life, or length of an individual run of a batch of catalyst, and thus reduces operating costs. The same is true in connection with catalytic dehydrogenation processes, and the like.

I claim:

1. In the catalytic polymerization of olefin hydrocarbons, the improvement which comprises passing an olefin-containing hydrocarbon mixture down through a mass of a granular silica-alumina polymerization catalyst under polymerizing conditions of temperature and pressure, the said granular silica-alumina catalyst having been graded as to size and disposed in a polymerization chamber with finer particles at the bottom and coarser particles at the top.

2. In the polymerization of low boiling olefins to polymers in the gasoline boiling range in the presence of a bed of granular silica-alumina polymerization catalyst of non-uniform particle size in a vertical catalyst chamber of relatively large cross section, the said catalyst having the property of promoting concomitantly the formation on itself of a carbonaceous deposit, the method of prolonging the period of useful life of said catalyst and decreasing the rate of increase of pressure drop through said bed which comprises classifying said catalytic material in a plurality of portions in each of which the ratio of the diameters of the largest and smallest particles does not exceed about 4:1, the average particle size of each portion differing from the other portion, charging said classified catalytic material to a vertical catalyst chamber of relatively large cross section with the smallest particles at the bottom and a general increase in particle size from bottom to top and subsequently passing low boiling olefins substantially free of suspended material under polymerization conditions of temperature and pressure to the top of said vertical catalyst chamber and removing polymerized products from the bottom of said chamber.

3. In the catalytic conversion of a fluid hydrocarbon material in a vertical catalyst chamber of relatively large cross section by means of a solid granular catalytic material of non-uniform particle size which has the attendant property of promoting the formation of deleterious carbonaceous deposits on itself, the improvement which comprises passing such a hydrocarbon material substantially free of suspended matter under suitable conversion conditions down through a bed of such a catalyst, the said catalyst having been classified into a plurality of fractions, each of a relatively uniform particle size and differing from each other as to average particle size, and disposed as a bed in said vertical catalyst chamber in an order of decreasing average particle size from the inlet of said chamber to the outlet of said chamber.

4. In the catalytic polymerization of olefin hydrocarbons in the presence of a solid granular olefin-polymerization catalyst of non-uniform particle size in a vertical catalyst chamber of enlarged cross section, the said catalyst having a tendency to promote the concomitant formation on itself of a deleterious carbonaceous deposit, the improvement which comprises classifying said granular olefin-polymerization catalyst into a plurality of fractions, each of relatively uniform particle size and differing from each other as to average particle size, disposing said classified catalyst in a vertical catalyst chamber of enlarged cross section in an order of decreasing particle size from the top of said chamber to the bottom of said chamber, introducing olefin hydrocarbons under polymerization conditions of temperature and pressure at the top of said chamber, and withdrawing the polymerized effluent from the bottom of said chamber.

5. In the catalytic polymerization of olefin hydrocarbons in the presence of a solid granular olefin-polymerization catalyst of non-uniform particle size in a vertical catalyst chamber of enlarged cross section, the said catalyst having a tendency to promote the concomitant formation on itself of a deleterious carbonaceous deposit, the improvement which comprises classifying said granular olefin-polymerization catalyst into a plurality of fractions, each of relatively uniform particle size and differing from each other as to average particle size, disposing said classified catalyst in a vertical catalyst chamber of enlarged cross section in an order of decreasing particle size from the inlet of said chamber to the outlet of said chamber, introducing olefin hydrocarbons under polymerization conditions of temperature and pressure at the inlet of said chamber, and withdrawing the polymerized effluent from the outlet of said chamber.

6. In the catalytic conversion of a fluid hydrocarbon material to produce other hydrocarbon materials in the presence of a solid granular conversion catalyst of non-uniform particle size in a vertical catalyst chamber of enlarged cross section, the said catalyst having a tendency to promote the concomitant formation on itself of a deleterious carbonaceous deposit, the improvement which comprises classifying said granular conversion catalyst into a plurality of fractions, each of relatively uniform particle size and differing from each other as to average particle size, disposing said classified catalyst in a vertical catalyst chamber of enlarged cross section in an order of decreasing particle size from the inlet of said chamber to the outlet of said chamber, introducing a fluid hydrocarbon material under reaction conditions of temperature and pressure at the inlet of said chamber, and withdrawing the converted effluent from the outlet of said chamber.

7. In the catalytic conversion of a fluid hydrocarbon material to produce other hydrocarbon materials in the presence of a solid granular conversion catalyst of non-uniform particle size in a vertical catalyst chamber of enlarged cross section, the said catalyst having a tendency to promote the concomitant formation on itself of a deleterious carbonaceous deposit, the improvement which comprises classifying said granular conversion catalyst into a plurality of fractions, each of relatively uniform particle size and differing from each other as to average particle size, disposing said classified catalyst in a vertical catalyst chamber of enlarged cross section in an order of decreasing particle size from the top of said chamber to the bottom of said chamber, introducing a fluid hydrocarbon material under reaction conditions of temperature and pressure at the top of said chamber, and withdrawing the converted effluent from the bottom of said chamber.

KARL H. HACHMUTH.